(12) United States Patent
Graef

(10) Patent No.: US 8,503,128 B2
(45) Date of Patent: Aug. 6, 2013

(54) SYSTEMS AND METHODS FOR VARIABLE COMPENSATED FLY HEIGHT MEASUREMENT

(75) Inventor: Nils Graef, Milpitas, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 13/326,493

(22) Filed: Dec. 15, 2011

(65) Prior Publication Data

US 2012/0087035 A1 Apr. 12, 2012

Related U.S. Application Data

(63) Continuation of application No. 12/669,483, filed as application No. PCT/US2008/071367 on Jul. 28, 2008, now Pat. No. 8,098,451.

(51) Int. Cl.
*G11B 21/02* (2006.01)

(52) U.S. Cl.
USPC ........................................................ 360/75

(58) Field of Classification Search
None
See application file for complete search history.

(56) References Cited

U.S. PATENT DOCUMENTS

| | | | |
|---|---|---|---|
| 4,715,257 A | 12/1987 | Endo et al. | |
| 4,777,544 A | 10/1988 | Brown et al. | |
| 5,086,475 A | 2/1992 | Kageyama et al. | |
| 5,111,727 A | 5/1992 | Rossum | |
| 5,377,058 A | 12/1994 | Good et al. | |
| 5,814,750 A | 9/1998 | Read et al. | |
| 6,097,559 A | 8/2000 | Ottensen et al. | |
| 6,191,901 B1 | 2/2001 | Carlson | |
| 6,519,102 B1 | 2/2003 | Smith et al. | |
| 6,937,424 B2 | 8/2005 | Chang et al. | |
| 7,038,875 B2 | 5/2006 | Lou et al. | |
| 7,158,325 B1 | 1/2007 | Hu et al. | |
| 8,098,451 B2 * | 1/2012 | Graef | 360/75 |
| 2004/0093554 A1 | 5/2004 | Hung | |
| 2005/0046982 A1 | 3/2005 | Liu et al. | |
| 2007/0268615 A1 | 11/2007 | McFadyen et al. | |
| 2008/0018786 A1 | 1/2008 | Kageyama et al. | |
| 2009/0299666 A1 | 12/2009 | Kang et al. | |

FOREIGN PATENT DOCUMENTS

| | | |
|---|---|---|
| EP | 2031759 | 3/2004 |
| WO | WO 02/093546 | 11/2002 |
| WO | PCT/US2008/071367 | 7/2008 |
| WO | WO 2010/014078 | 2/2010 |

OTHER PUBLICATIONS

U.S. Appl. No. 12/669,483, filed Aug. 12, 2010, Graef, Nils.
U.S. Appl. No. 12/851,425, filed Aug. 5, 2010, Mathew et al.
U.S. Appl. No. 12/851,455, filed Aug. 5, 2010, Mathew et al.
U.S. Appl. No. 12/856,782, filed Aug. 16, 2010, Mathew et al.
U.S. Appl. No. 12/875,734, filed Sep. 3, 2010, Mathew et al.
U.S. Appl. No. 13/185,562, filed Jul. 19, 2011, Xia, Haitao et al.
Fertner, Antoni "Frequency-Domain Echo Canceller With Phase Adjustment" IEEE Transactions on circuits and Systems-II; Analog and Digital Signal Processing, V. 44 No. 10 Oct. 1997.
Liu, et al., "Head Disk Spacing Variation Suppression via Active Flying Height Control" IEEE Instrumentation and Measurement Technology Conf. Budapest, Hungary May 21-23, 2001.

* cited by examiner

*Primary Examiner* — K. Wong
(74) *Attorney, Agent, or Firm* — Hamilton DeSanctis & Cha

(57) ABSTRACT

Various embodiments of the present invention provide systems and methods for determining fly height.

20 Claims, 7 Drawing Sheets

SYSTEMS AND METHODS FOR VARIABLE COMPENSATED FLY HEIGHT MEASUREMENT

CROSS REFERENCE TO RELATED CASES

The present application is a continuation of U.S. patent application Ser. No. 12/669,483 entitled "Systems and Methods for Variable Compensated Fly Height Measurement", and filed Jan. 16, 2010, now U.S. Pat. No. 8,098,451, by Graef. The aforementioned patent application claims priority to PCT Appl. No. US2008/71367 entitled "Systems and Methods for Variable Compensated Fly Height Measurement", and filed Jul. 28, 2008 by Graef. The entirety of both of the aforementioned patent applications is incorporated herein by reference for all purposes.

BACKGROUND OF THE INVENTION

The present inventions are related to systems and methods for transferring information to and from a storage medium, and more particularly to systems and methods for positioning a sensor in relation to a storage medium.

Various electronic storage medium are accessed through use of a read/write head assembly that is positioned in relation to the storage medium. The read/write head assembly is supported by a head actuator, and is operable to read information from the storage medium and to write information to the storage medium. The height between the read/write head assembly and the storage medium is typically referred to as the fly height. Control of the fly height is critical to proper operation of a storage system. In particular, increasing the distance between the read/write head assembly and the storage medium typically results in an increase in inter symbol interference. Where inter symbol interference becomes unacceptably high, it may become impossible to credibly read the information originally written to the storage medium. In contrast, a fly height that is too small can result in excess wear on the read/write head assembly and/or a premature crash of the storage device.

In a typical storage device, fly height is set to operate in a predetermined range. During operation, the fly height is periodically measured to assure that it continues to operate in the predetermined region. A variety of approaches for measuring fly height have been developed including optical interference, spectrum analysis of a read signal wave form, and measuring a pulse width value of the read signal. Such approaches in general provide a reasonable estimate of fly height, however, they are susceptible to various errors. Such errors require that the predetermined operating range of the fly height be maintained sufficiently large to account for the various errors. This may result in setting the fly height such that inter symbol interference is too high.

Hence, for at least the aforementioned reasons, there exists a need in the art for advanced systems and methods for positioning a sensor in relation to a storage medium.

BRIEF SUMMARY OF THE INVENTION

The present inventions are related to systems and methods for transferring information to and from a storage medium, and more particularly to systems and methods for positioning a sensor in relation to a storage medium.

Various embodiments of the present invention provide methods for calculating relative fly height. Such methods include disposing a head assembly a fly height distance from a storage medium, writing a write pattern from a write circuit, and receiving the write pattern at the read circuit. Based on the write pattern, a compensation variable is calculated and stored. A stored pattern is received from the storage medium, and based at least on the stored pattern and the compensation variable, an indication of the fly height distance is calculated. In some instances of the aforementioned embodiments, the write pattern and the stored pattern are periodic patterns such as 2T, 3T, 4T, 5T, 6T, . . . , or the like. A 2T pattern includes two logic 1s followed by two logic 0s. Similarly, a 3T pattern includes three logic 1s followed by three logic 0s. Other periodic patterns exhibit similar periodicity.

In some cases, calculating the compensation variable includes determining a fundamental frequency of a signal corresponding to the received write pattern, and determining a higher order harmonic of the signal corresponding to the received write pattern. The fundamental frequency is divided by the higher order harmonic to create the compensation variable. The higher order harmonic may be, but is not limited to, a third order harmonic, a fourth order harmonic, or a sixth order harmonic. In particular instances of the aforementioned embodiments, determining the fundamental frequency and determining the higher order harmonic is done by performing a discrete Fourier transform.

In various cases, calculating the indication of the fly height distance includes determining a fundamental frequency of a signal corresponding to the received stored pattern, and determining a higher order harmonic of the signal corresponding to the received stored pattern. The fundamental frequency is divided by the higher order harmonic and the compensation variable to yield the indication of the fly height distance. The higher order harmonic may be, but is not limited to, a second order harmonic, a third order harmonic, a fourth order harmonic, a fifth order harmonic, a sixth order harmonic, or the like. In particular instances of the aforementioned embodiments, determining the fundamental frequency and determining the higher order harmonic is done by performing a discrete Fourier transform.

In particular instances of the aforementioned embodiments, the compensation variable accounts for one or more of temperature variation and supply voltage variation in an analog front end associated with the read circuit. In such situations, multiple compensation variables may be generated that are specific to one or more combinations of temperature and/or supply voltage. In various instances, the write pattern provides a fundamental frequency that corresponds to a particular disk zone of the storage medium. In such cases, multiple compensation variables may be generated that are specific to particular disk zones. In some instances, multiple compensation variables may be generated that are specific to one or more combinations of temperature, supply voltage, and/or disk zone.

In some instances of the aforementioned embodiments, the read circuit includes an analog front end, and the compensation variable compensates for temperature variation and/or supply voltage variation in the analog front end. In such instances, calculating the compensation variable includes calculating a first compensation variable for a first combination including one or more of temperature and supply voltage, and calculating a second compensation variable for a second combination including one or more of temperature and supply voltage. The method further includes selecting one of the first compensation variable and the second compensation variable based on one or more of a temperature measurement and/or a supply voltage measurement. Calculating the indication of the fly height distance includes determining a fundamental frequency of a signal corresponding to the received stored pattern, determining a higher order harmonic of the signal corresponding to the received stored pattern, and dividing the fundamental frequency by the higher order harmonic and the selected compensation variable to create the indication of the fly height distance.

Other embodiments of the present invention provide systems for determining fly height. Such systems include a head assembly disposed in relation to a storage medium, a write channel, and a read circuit. The read circuit is operable to receive information from both the head assembly and the write channel. A frequency determination circuit is included that is operable to receive a first signal from the read circuit corresponding to information received from the write channel and to provide a first fundamental frequency and a first higher order frequency based on the first signal, and the frequency determination circuit is operable to receive a second signal from the read circuit corresponding to information received from the head assembly channel and to provide a second fundamental frequency and a second higher order frequency based on the second signal. A compensation variable calculation module is included that is operable to divide the first fundamental frequency by the first higher order harmonic to yield a compensation variable. A fly height calculation module is included that is operable to divide the second fundamental frequency by the second higher order harmonic and the compensation variable to yield an indication of a distance between the head assembly and the storage medium.

Yet other embodiments of the present invention provide storage systems that include a storage medium, a head assembly disposed a distance from the storage medium, a write circuit and a read circuit. The read circuit is operable to receive information from both the head assembly and the write circuit. Further, the read circuit includes at least an amplifier that is susceptible to temperature variation and supply voltage variation. The storage systems further include a frequency determination module that is operable to receive a first signal from the read circuit corresponding to information received from the write circuit at a defined amplifier temperature and amplifier supply voltage, and to provide a first fundamental frequency and a first higher order frequency based on the first signal. The frequency determination circuit is also operable to receive a second signal from the read circuit corresponding to information received from the head assembly channel and to provide a second fundamental frequency and a second higher order frequency based on the second signal. A compensation variable calculation module is included that is operable to divide the first fundamental frequency by the first higher order harmonic to yield a compensation variable specific to the defined amplifier temperature and defined amplifier supply voltage. A temperature sensor is included to provide a measured amplifier temperature, and a supply voltage sensor is included to provide a measured amplifier supply voltage. A fly height calculation module is included that is operable to select the compensation variable based at least in part on the measured amplifier temperature and the measured amplifier supply voltage, and to divide the second fundamental frequency by the second higher order harmonic and the compensation variable to yield an indication of the distance.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information to and from a storage medium, and more particularly to systems and methods for positioning a sensor in relation to a storage medium.

Figure 1:
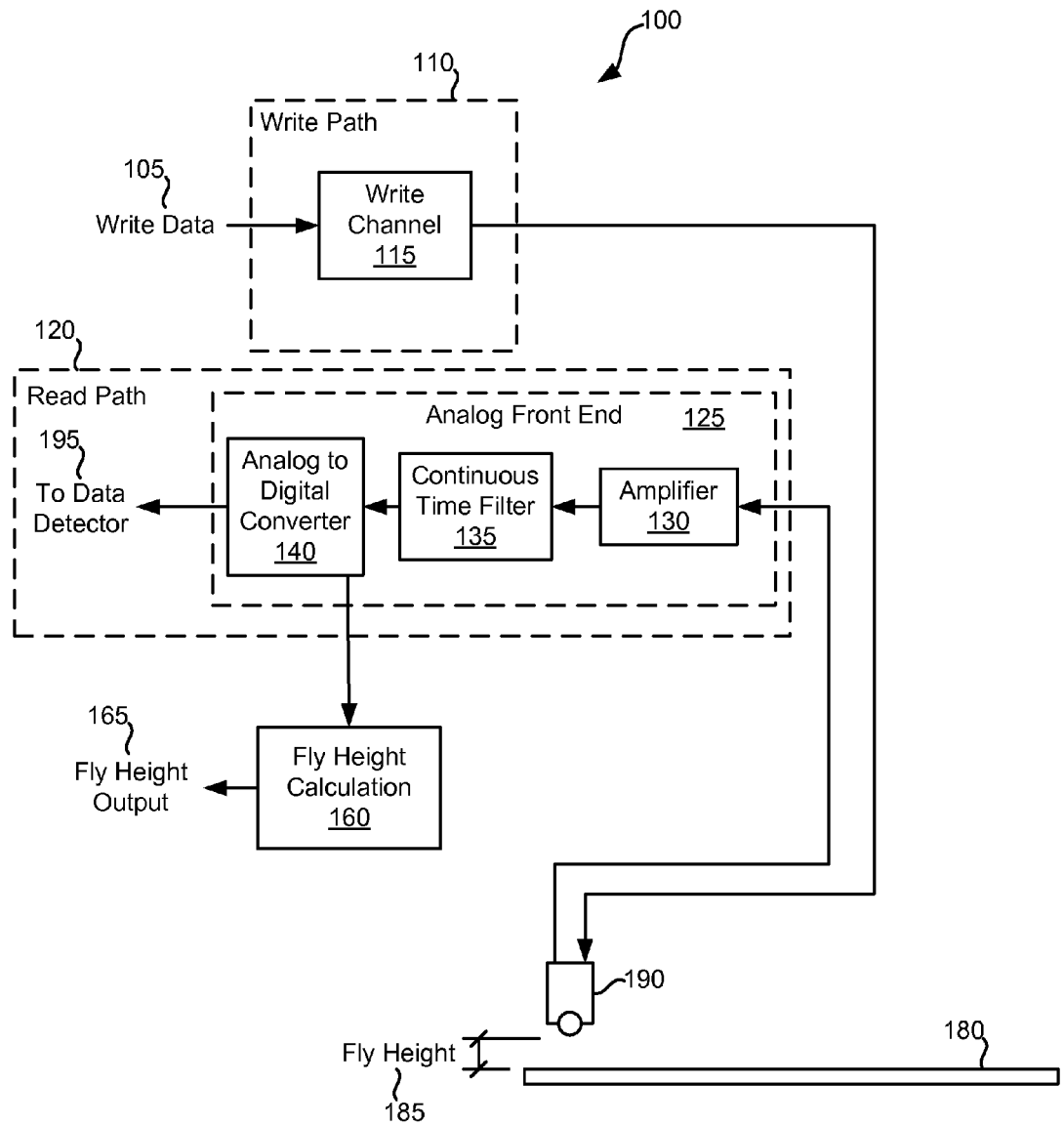
FIG. 1 depicts a prior art fly height measurement system.

Turning to FIG. 1, a prior art fly height measurement system 100 is depicted. Fly height measurement system 100 includes a write circuit 110 and a read circuit 120. Write circuit 110 includes a write channel 115 that receives digital write data 105 and provides it in writable format to a read/write head assembly 190 as is known in the art. Read circuit 120 includes an analog front end 125 that receives information from read/write head assembly 190 and provides the received data as a digital data stream to a data detector 195 as is known in the art. In particular, analog front end 125 includes an amplifier 130 that receives the raw analog signal from read/write head assembly 190. Amplifier 130 provides an amplified output to a continuous time filter 135 that performs an analog low pass filter function and provides a filtered output to an analog to digital converter 140. Analog to digital converter 140 converts the analog signal to a series of digital bits that are provided to a data detector 195.

The output of analog to digital converter 140 is also provided to a fly height calculation module 160 that is operable to determine whether a fly height 185 is too large or too small. As shown, fly height 185 is the distance from read/write head assembly 190 to the surface of a disk platter 180. The relative fly height is provided as a fly height output 165.

In operation, a series of logic 1s and logic 0s are originally written to disk platter 180 such that when read they result in a sine wave at the output of amplifier 130. The sine wave exhibits a fundamental frequency. Fly height calculation module 160 performs a discrete Fourier transform that yields not only the fundamental frequency of the sine wave, but also the third harmonic of the sine wave. From this, a fly height factor (i.e., fly height output 165) can be calculated based on the following equation:

$$\text{Fly Height Output } 165 = \frac{\text{Measured Fundamental Frequency}}{\text{Measured Third Harmonic Frequency}}.$$

When the fly height increases, the third harmonic frequency decreases relative to the fundamental frequency (i.e., fly height output 165 increases). When the fly height decreases, the third harmonic frequency increases relative to the fundamental frequency (i.e., fly height output 165 decreases).

It has been determined, however, that fly height output 165 may vary substantially over temperature, process and/or supply voltage. Hence, while the aforementioned equation provides a reasonable estimate of relative fly height, it can be substantially inaccurate where variations in temperature, voltage and process exist in analog front end 125. Based on this, it has been determined that fly height output 165 is more accurately represented by the following equation:

$$\text{Fly Height Output } 165 = \frac{\text{Measured Fundamental Frequency}}{\text{Measured Third Harmonic Frequency}} * \alpha_{AFE},$$

where $\alpha_{AFE}$ is a process, temperature and/or voltage dependent variable accounting for the variation in analog front end 125. Various embodiments of the present invention provide systems and methods that account for $\alpha_{AFE}$, and thereby provide for more accurate determination of fly height.

Figure 2:
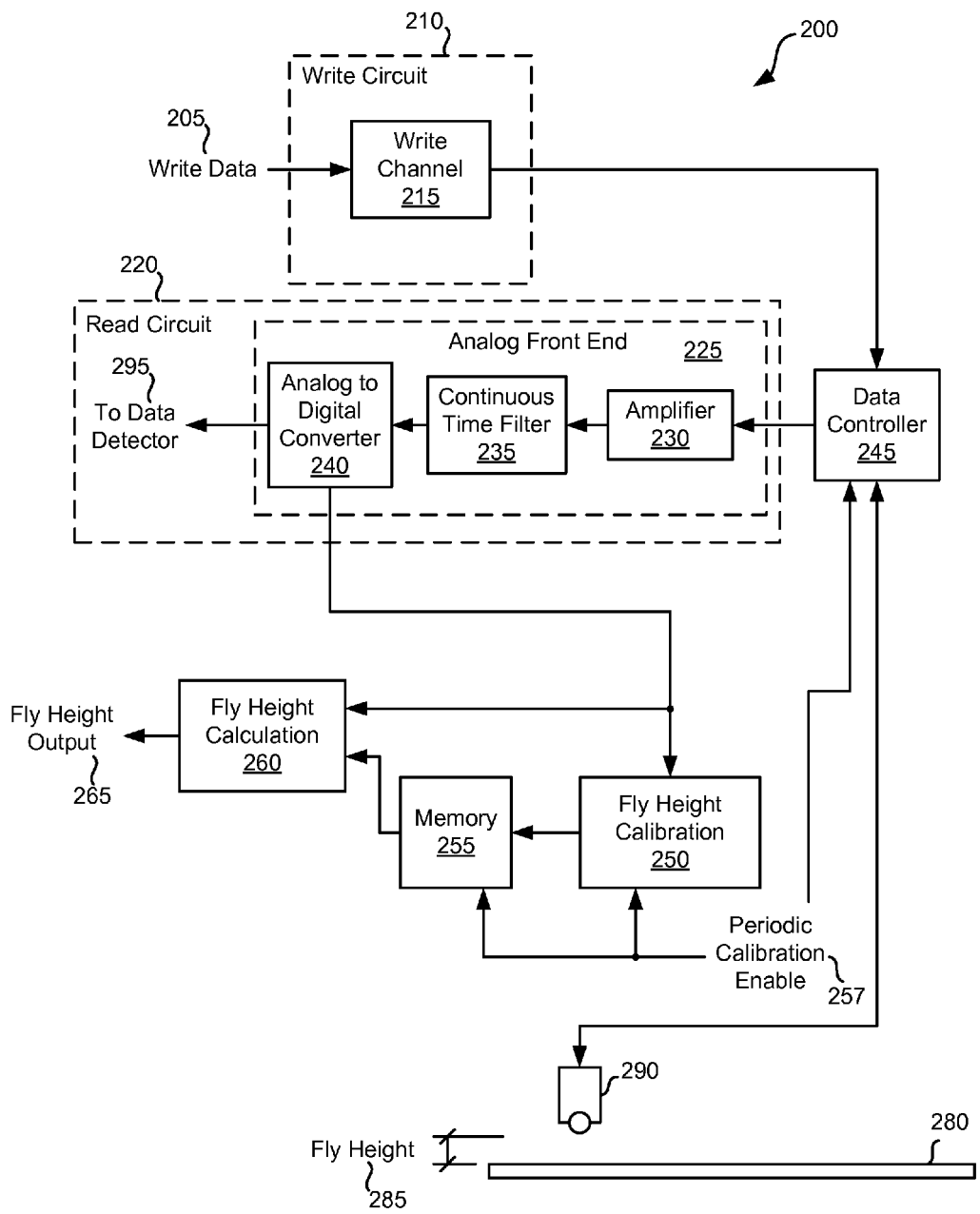
FIG. 2 depicts a fly height measurement system including variable compensation in accordance with one or more embodiments of the present invention.

Turning to FIG. 2, a fly height measurement system 200 including variable compensation in accordance with one or more embodiments of the present invention is depicted. Fly height measurement system 200 includes a write circuit 210 and a read circuit 220. Write circuit 210 includes a write channel 215 that receives digital write data 205 and provides it in writable format to a read/write head assembly 290. Write circuit 210 may be any circuit, assembly and/or processor based function capable of transferring information to a read/write head assembly. Based on the disclosure provided herein, one of ordinary skill in the art will recognize a variety of write circuits that may be used in relation to different embodiments of the present invention. Read circuit 220 includes an analog front end 225 that receives information from read/write head assembly 290 and provides the received data as a digital data stream to a data detector 295. Read circuit 220 may be any circuit, assembly and/or processor based function capable of transferring information from a read/write head assembly to a receiving device. Based on the disclosure provided herein, one of ordinary skill in the art will recognize a variety of read circuits that may be used in relation to different embodiments of the present invention.

Analog front end 225 may include an amplifier 230 that receives the raw analog signal from read/write head assembly 290. Amplifier 230 provides an amplified output to a continuous time filter 235 that performs an analog low pass filter function and provides a filtered output to an analog to digital converter 240. Analog to digital converter 240 converts the analog signal to a series of digital bits that are provided to a data detector 295. Analog front end 225 may be any circuit, assembly and/or processor based function capable of receiving information from a read/write head assembly and providing a digital representation thereof. Based on the disclosure provided herein, one of ordinary skill in the art will recognize a variety of analog front ends that may be used in relation to different embodiments of the present invention. Further, read/write head assembly 290 may be any circuit, device and/or assembly capable of recording information to a storage medium and for sensing information previously written to the storage medium. Based on the disclosure provided herein, one of ordinary skill in the art will recognize a variety of read/write head assemblies that may be used in relation to different embodiments of the present invention.

A data controller circuit 245 is included that provides for directing data from write circuit 210 to either read/write head assembly 290 (i.e., standard write mode) or to read circuit 220 (i.e., loopback mode), and from read/write head assembly 290 to read circuit 220 (i.e., standard read mode). The output of analog to digital converter 240 is additionally provided to a fly height calculation module 260 that is operable to determine whether a fly height 285 is too large or too small. As shown, fly height 285 is the distance from read/write head assembly 290 to the surface of a disk platter 280. The relative fly height is provided as a fly height output 265. Further, the output of analog to digital converter 240 is provided to a fly height calibration module 250 that is operable to determine $\alpha_{AFE}$ for analog front end 225. Fly height calibration module 250 is enabled based on a periodic calibration enable signal 257, and the determined $\alpha_{AFE}$ value is updated to a memory 255 whenever periodic calibration enable signal 257 is asserted. The $\alpha_{AFE}$ may be retrieved from memory 255 and used by fly height calculation module 260 to calculate fly height output 265.

In operation, data controller 245 is configured in loopback mode when periodic calibration enable 257 is asserted so that data written via write circuit 210 is provided to read circuit 220. In this configuration, a series of logic 1s and logic 0s are written via write circuit 210 to read circuit. The series of logic 1s and logic 0s result in a sine wave at the output of continuous time filter 235. It should be noted that other repetitive waveforms may be used in place of a sine wave. The sine wave exhibits a fundamental frequency. When periodic calibration enable 257 is asserted, fly height calibration module 250 performs a discrete Fourier transform on the received sine wave that yields not only the fundamental frequency of the sine wave, but also the third harmonic of the sine wave. From this, $\alpha_{AFE}$ is calculated based on the following equation:

$$\alpha_{AFE} = \frac{\text{Measured Fundamental Frequency in Loopback Mode}}{\text{Measured Third Harmonic Frequency in Loopback Mode}}.$$

This value of $\alpha_{AFE}$ is written to memory 255. In one particular embodiment of the present invention, fly height calibration module 250 includes a discrete time Fourier transform circuit capable of providing the fundamental frequency and the third harmonic frequency. These two frequencies are provided to a processor that executes firmware/software instructions that performs the mathematical manipulation of the preceding equation. In other embodiments of the present invention, the mathematical manipulation is performed in hardware.

During standard operation when periodic calibration enable 257 is not asserted, a corresponding series of logic 0s and logic 1s read from disk platter 280 via read/write head assembly 290, and provided to read circuit 225 by data controller 245. The output from analog to digital converter 240 is provided to fly height calculation module 260. Fly height calculation module 260 performs a discrete Fourier transform that again yields the fundamental frequency of the sine wave and the third harmonic of the sine wave. From this and the value of $\alpha_{AFE}$ from memory 255, a fly height factor (i.e., fly height output 265) can be calculated based on the following equation:

$$\text{Fly Height Output 265} = \frac{\text{Measured Fundamental Frequency}}{\text{Measured Third Harmonic Frequency}} * \alpha_{AFE}.$$

When the fly height increases, the third harmonic frequency decreases relative to the fundamental frequency (i.e., fly height output 265 increases). When the fly height decreases, the third harmonic frequency increases relative to the fundamental frequency (i.e., fly height output 265 decreases). By incorporating $\alpha_{AFE}$ in the calculation of fly height output 265, the variations on analog front end due to temperature, supply voltage and process can be reduced.

Figure 3:
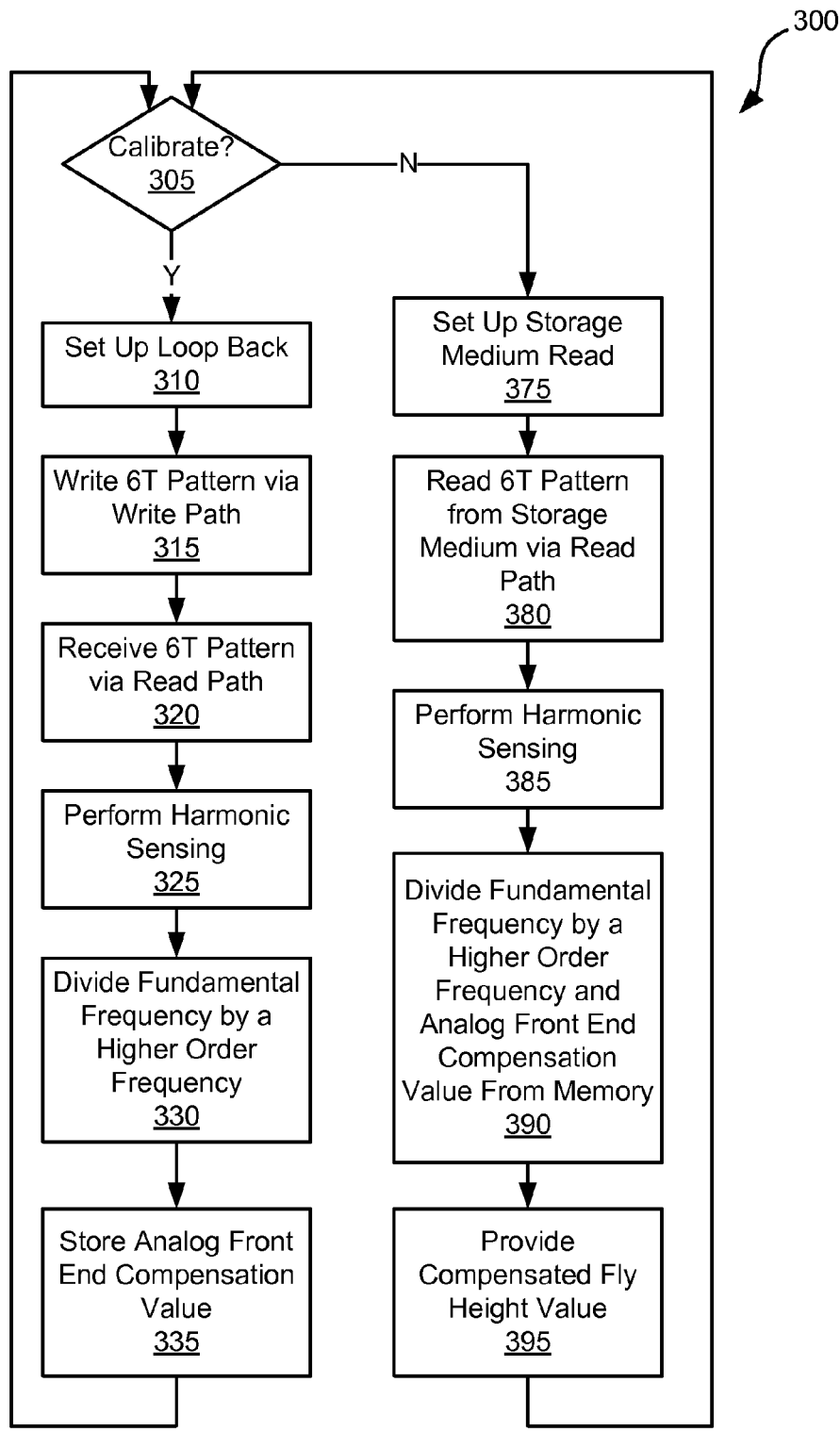
FIG. 3 is a flow diagram depicting a method in accordance with some embodiments of the present invention for determining fly height.

Turning to FIG. 3, a flow diagram 300 depicts a method in accordance with some embodiments of the present invention for determining fly height. Following flow diagram 300, it is determined whether a calibration process is selected (block 305). Such a calibration process may be selected by, for example, asserting periodic calibration enable 257. Where a calibration process is selected (block 305), a data loopback is setup (block 310). Such a loopback provides for passing data written via a write circuit directly to the read circuit. A 6T pattern (i.e., 111111000000 having a period of 12T) is written via the write circuit (block 315), and received via the read circuit (block 320). Such a pattern yields a sine wave. Harmonic sensing is performed on the sine wave to determine the fundamental frequency of the sine wave and the third harmonic frequency of the sine wave (block 325). In one particular embodiment of the present invention, the harmonic sensing is done using a discrete Fourier transform that yields the fundamental frequency and the third harmonic frequency. The fundamental frequency is divided by the third harmonic frequency to yield $\alpha_{AFE}$ (block 330) that is stored to a memory (block 335).

In normal operation mode (i.e., when calibration is not selected) (block 305), the system is set up to transfer information from the storage medium to the read circuit (block 375). A 6T pattern is read from the storage medium (block 380), and harmonic sensing is performed on the 6T pattern (block 385). The harmonic sensing may be the same harmonic sensing used during the calibration phase. Thus, for example, the harmonic sensing may be done by performing a discrete Fourier transform on the sine wave generated by the 6T pattern. This yields both the fundamental frequency of the sine wave and the third harmonic frequency of the sine wave. The fundamental frequency is divided by the third harmonic frequency and the $\alpha_{AFE}$ value previously stored in memory (block 390). The resulting value is provided as a compensated fly height value (block 395).

Figure 4:
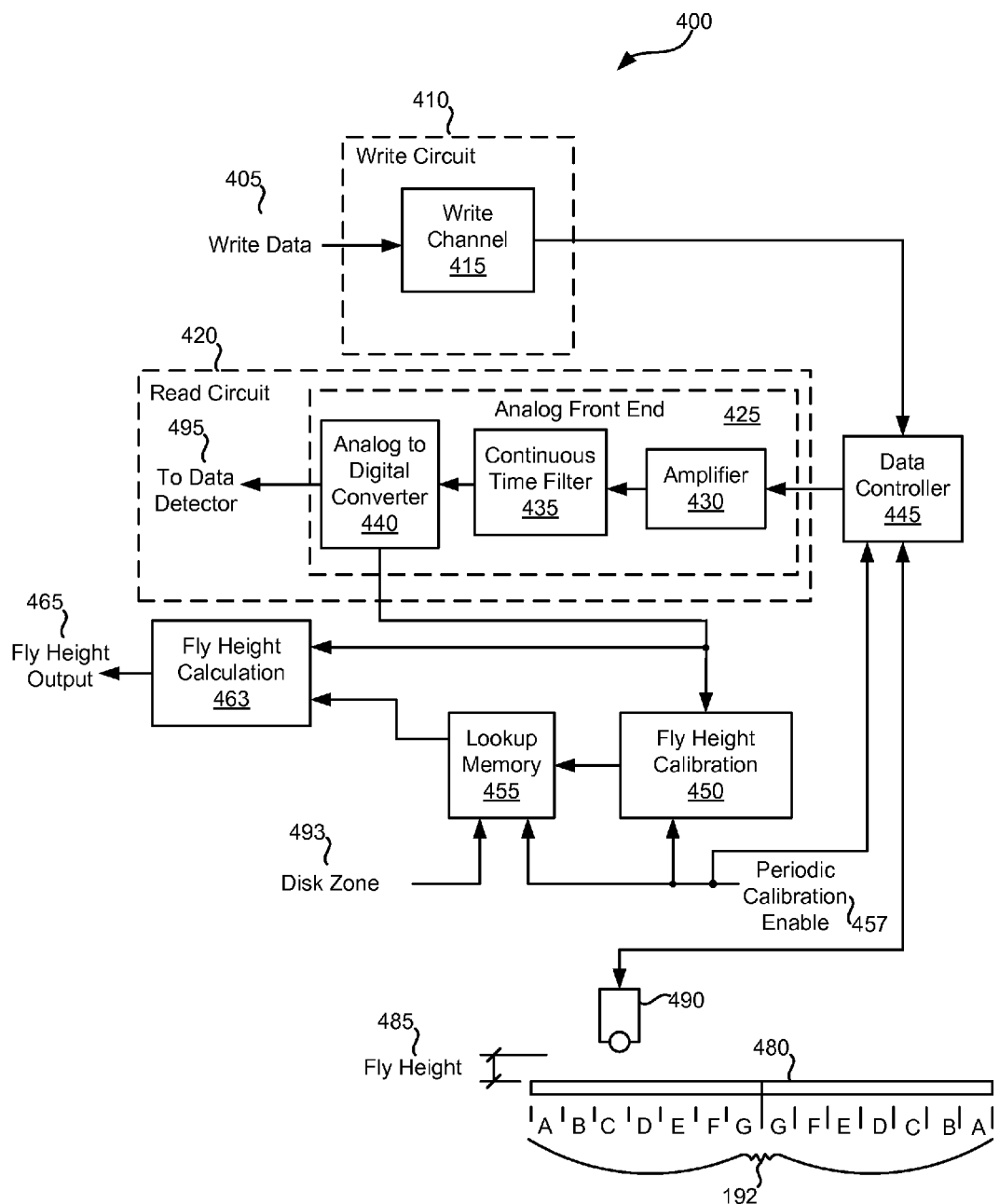
FIG. 4 shows a fly height measurement system including variable compensation by disk zone in accordance with one or more embodiments of the present invention.

Turning to FIG. 4, a fly height measurement system 400 is depicted that includes variable compensation by disk zone in accordance with one or more embodiments of the present invention. Fly height measurement system 400 includes a write circuit 410 and a read circuit 420. Write circuit 410 includes a write channel 415 that receives digital write data 405 and provides it in writable format to a read/write head assembly 490. Write circuit 410 may be any circuit, assembly and/or processor based function capable of transferring information to a read/write head assembly. Based on the disclosure provided herein, one of ordinary skill in the art will recognize a variety of write circuits that may be used in relation to different embodiments of the present invention. Read circuit 420 includes an analog front end 425 that receives information from read/write head assembly 490 and provides the received data as a digital data stream to a data detector 495. Read circuit 420 may be any circuit, assembly and/or processor based function capable of transferring information from a read/write head assembly to a receiving device. Based on the disclosure provided herein, one of ordinary skill in the art will recognize a variety of read circuits that may be used in relation to different embodiments of the present invention.

Analog front end 425 may include an amplifier 430 that receives the raw analog signal from read/write head assembly 490. Amplifier 430 provides an amplified output to a continuous time filter 435 that performs an analog low pass filter function and provides a filtered output to an analog to digital converter 440. Analog to digital converter 440 converts the analog signal to a series of digital bits that are provided to a data detector 495. Analog front end 425 may be any circuit, assembly and/or processor based function capable of receiving information from a read/write head assembly and providing a digital representation thereof. Based on the disclosure provided herein, one of ordinary skill in the art will recognize a variety of analog front ends that may be used in relation to different embodiments of the present invention. Further, read/write head assembly 490 may be any circuit, device and/or assembly capable of recording information to a storage medium and for sensing information previously written to the storage medium. Based on the disclosure provided herein, one of ordinary skill in the art will recognize a variety of read/write head assemblies that may be used in relation to different embodiments of the present invention.

A data controller circuit 445 is included that provides for directing data from write circuit 410 to either read/write head assembly 490 (i.e., standard write mode) or to read circuit 420 (i.e., loopback mode), and from read/write head assembly 490 to read circuit 420 (i.e., standard read mode). The output of analog to digital converter 440 is additionally provided to a fly height calculation module 460 that is operable to determine whether a fly height 485 is too large or too small. As shown, fly height 485 is the distance from read/write head assembly 490 to the surface of a disk platter 480. The relative fly height is provided as a fly height output 465. Further, the output of analog to digital converter 440 is provided to a fly height calibration module 450 that is operable to determine $\alpha_{AFE}$ for analog front end 425. Fly height calibration module 450 is enabled based on a periodic calibration enable signal 457, and the determined $\alpha_{AFE}$ value is updated to a lookup memory 455 whenever periodic calibration enable signal 457. The $\alpha_{AFE}$ may be retrieved from memory 455 and used by fly height calculation module 460 to calculate fly height output 465.

In operation, data controller 445 is configured in loopback mode when periodic calibration enable 457 is asserted so that data written via write circuit 410 is provided to read circuit 420. In this configuration, a series of logic 1s and logic 0s are written via write circuit 410 to read circuit 420. The series of logic 1s and logic 0s result in a sine wave at the output of continuous time filter 435. It should be noted that other repetitive waveforms may be used in place of a sine wave. The sine wave exhibits a fundamental frequency that differs depending upon which of a number of disk zones 492 that the pattern is expected to replicate. In particular, disk platter 480 is divided into a number of radial disk zones 492 that are labeled A-G. It should be noted that the number of disk zones is merely exemplary, and that any number of disk zones may be employed in accordance with different embodiments of the present invention. The fundamental frequency of a pattern written to reflect that written to a disk zone closer to the center (e.g., disk zone G) is higher than that written to reflect that written to a disk zone closer to the outer edge (e.g., disk zone A). The particular disk zone is indicated by a disk zone input 493 that indicates which of disk zones 492 is being replicated by the data written via write circuit 410. When periodic calibration enable 457 is asserted, fly height calibration module 450 performs a discrete Fourier transform on the received sine wave that yields not only the fundamental frequency of the sine wave, but also the third harmonic of the sine wave. From this, $\alpha_{AFE}$ is calculated based on the following equation:

$$\alpha_{AFE} = \frac{\text{Measured Fundamental Frequency in Loopback Mode}}{\text{Measured Third Harmonic Frequency in Loopback Mode}}.$$

This value of $\alpha_{AFE}$ is written to lookup memory 455 in a location dictated by disk zone input 493. In one particular embodiment of the present invention, fly height calibration module 450 includes a discrete time Fourier transform circuit capable of providing the fundamental frequency and the third harmonic frequency. These two frequencies are provided to a processor that executes firmware/software instructions that performs the mathematical manipulation of the preceding equation. In other embodiments of the present invention, the mathematical manipulation is performed in hardware. The process is repeated for each of disk zones 492 with a different value of $\alpha_{AFE}$ being written to lookup memory 455.

During standard operation when periodic calibration enable 457 is not asserted, a corresponding series of logic 0s and logic 1s read from disk platter 480 via read/write head assembly 490, and provided to read circuit 425 by data controller 445. At the time the data is received, disk zone input 493 is asserted indicating which of disk zones 492 that the pattern was derived from. The output from analog to digital converter 440 is provided to fly height calculation module 460. Fly height calculation module 460 performs a discrete Fourier transform that again yields the fundamental frequency of the sine wave and the third harmonic of the sine wave. From this and the value of $\alpha_{AFE}$ corresponding to the disk zone 492 identified by disk zone input 493 accessed from lookup memory 455, a fly height factor (i.e., fly height output 465) can be calculated based on the following equation:

$$\text{Fly Height Output 465} = \frac{\text{Measured Fundamental Frequency}}{\text{Measured Third Harmonic Frequency}} * \alpha_{AFE}.$$

When the fly height increases, the third harmonic frequency decreases relative to the fundamental frequency (i.e., fly height output 465 increases). When the fly height decreases, the third harmonic frequency increases relative to the fundamental frequency (i.e., fly height output 465 decreases). By incorporating $\alpha_{AFE}$ in the calculation of fly height output 465, the variations on analog front end due to temperature, supply voltage and process can be reduced. By using disk zones, a more accurate estimate of $\alpha_{AFE}$ can be generated specifically for a particular area from which data is generated.

Figure 5:
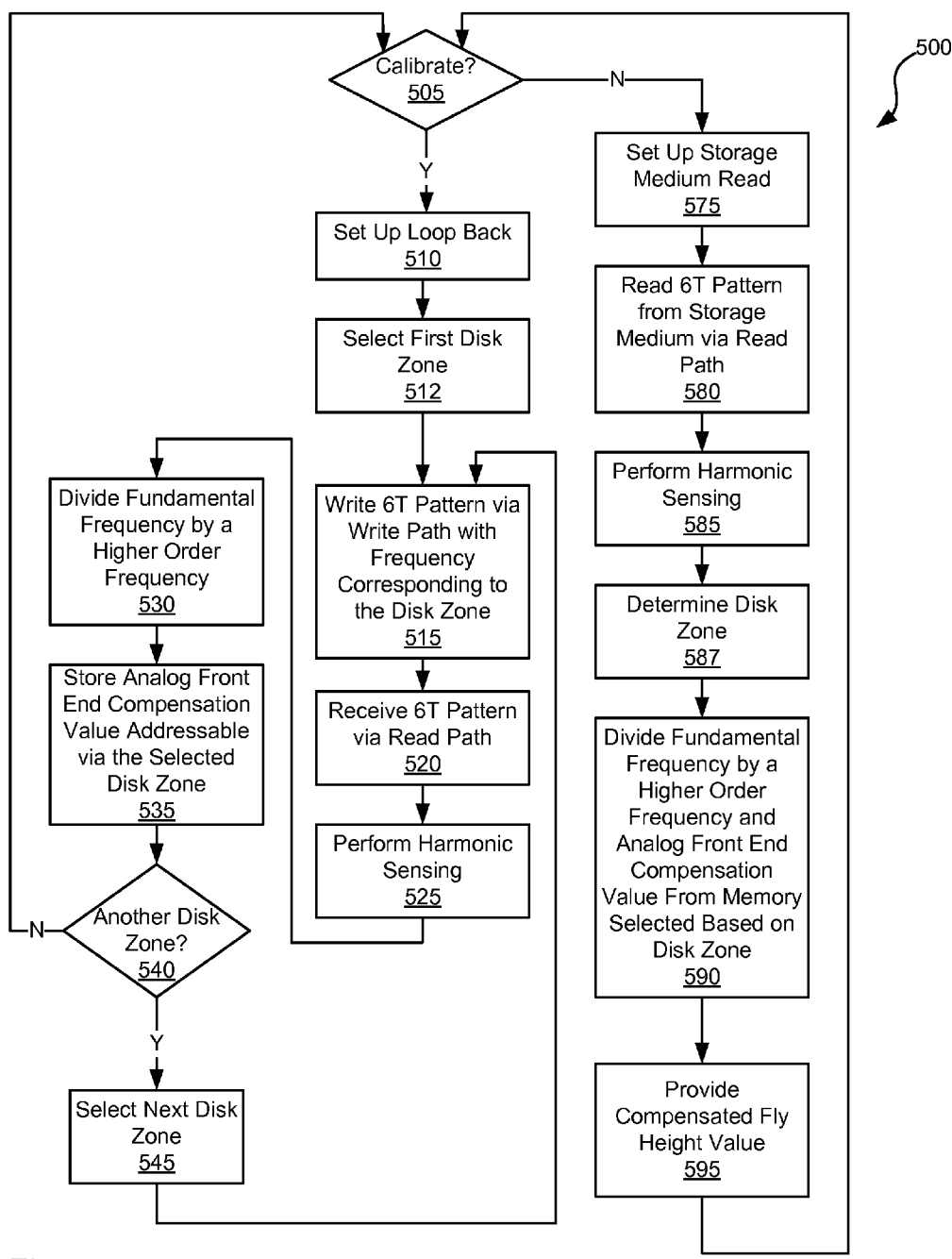
FIG. 5 is a flow diagram depicting a method in accordance with some embodiments of the present invention for determining fly height using disk zone information.

Turning to FIG. 5, a flow diagram 500 depicts a method in accordance with some embodiments of the present invention for determining fly height using disk zone specific information. Following flow diagram 500, it is determined whether a calibration process is selected (block 505). Such a calibration process may be selected by, for example, asserting periodic calibration enable 457. In some cases, calibration is done during fabrication of a storage system, during burn in of a storage medium, or a specified or selected times during the life of the storage system. Where a calibration process is selected (block 505), a data loopback is setup (block 510). Such a loopback provides for passing data written via a write circuit directly to the read circuit. In addition, a first disk zone is selected for which an $\alpha_{AFE}$ signal will be calculated (block 512). A 6T pattern (i.e., 111111000000 having a period of 12T) is written via the write circuit (block 515), and received via the read circuit (block 520). The frequency of the 6T pattern varies depending upon the selected disk zone. Such a pattern yields a sine wave. Harmonic sensing is performed on the sine wave to determine the fundamental frequency of the sine wave and the third harmonic frequency of the sine wave (block 525). In one particular embodiment of the present invention, the harmonic sensing is done using a discrete Fourier transform that yields the fundamental frequency and the third harmonic frequency. The fundamental frequency is divided by the third harmonic frequency to yield $\alpha_{AFE}$ (block 530) specific for the selected disk zone, and the $\alpha_{AFE}$ value is stored to a memory at an address that corresponds to the selected disk zone (block 535).

It is then determined whether additional disk zones remain for which $\alpha_{AFE}$ values are to be generated and stored to memory (block 540). Where additional disk zones remain (block 540), the next disk zone is selected (block 545) and the processes of blocks 515-540 are repeated for the selected disk zones. Where no additional disk zones remain (block 540), the memory has been filled with $\alpha_{AFE}$ values for each respective disk zone, and the process of calibration is considered complete.

In normal operation mode (i.e., when calibration is not selected) (block 505), the system is set up to transfer information from the storage medium to the read circuit (block 575). A 6T pattern is read from the storage medium (block 580), and harmonic sensing is performed on the 6T pattern (block 585). The harmonic sensing may be the same harmonic sensing used during the calibration phase. Thus, for example, the harmonic sensing may be done by performing a discrete Fourier transform on the sine wave generated by the 6T pattern. This yields both the fundamental frequency of the sine wave and the third harmonic frequency of the sine wave. The disk zone from which the data is derived is determined (block 587), and that information is used to select the appropriate $\alpha_{AFE}$ value from memory. The fundamental frequency is divided by the third harmonic frequency and the $\alpha_{AFE}$ value specific to the identified disk zone (block 590). The resulting value is provided as a compensated fly height value (block 595).

Figure 6:
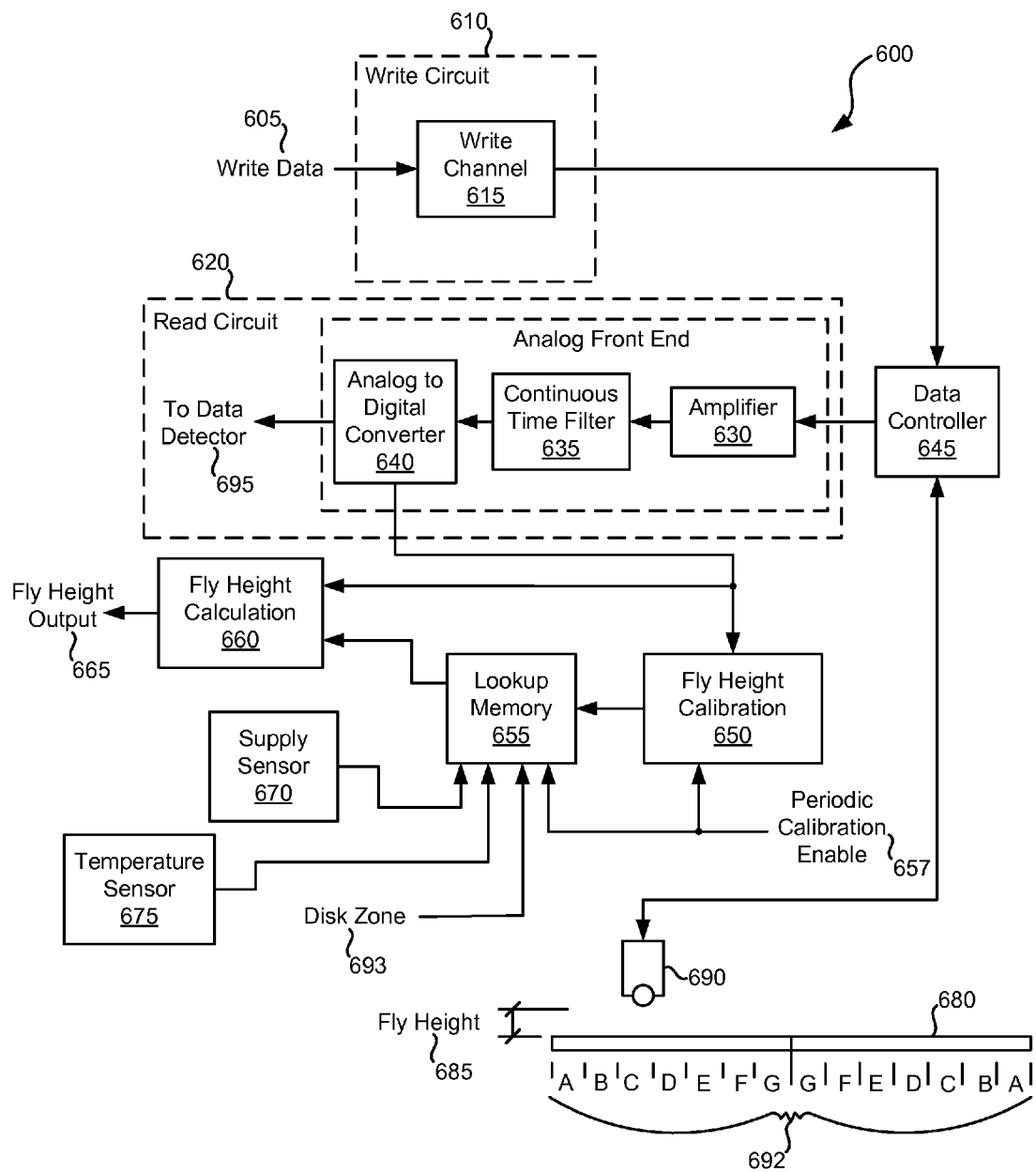
FIG. 6 shows a fly height measurement system including variable compensation by disk zone, temperature and voltage in accordance with one or more embodiments of the present invention.

Turning to FIG. 6, a fly height measurement system 600 is depicted that includes compensation by disk zone, temperature and voltage in accordance with one or more embodiments of the present invention. Fly height measurement system 600 includes a write circuit 610 and a read circuit 620. Write circuit 610 includes a write channel 615 that receives digital write data 605 and provides it in writable format to a read/write head assembly 690. Write circuit 610 may be any circuit, assembly and/or processor based function capable of transferring information to a read/write head assembly. Based on the disclosure provided herein, one of ordinary skill in the art will recognize a variety of write circuits that may be used in relation to different embodiments of the present invention. Read circuit 620 includes an analog front end 625 that receives information from read/write head assembly 690 and provides the received data as a digital data stream to a data detector 695. Read circuit 620 may be any circuit, assembly and/or processor based function capable of transferring information from a read/write head assembly to a receiving device. Based on the disclosure provided herein, one of ordinary skill in the art will recognize a variety of read circuits that may be used in relation to different embodiments of the present invention.

Analog front end 625 may include an amplifier 630 that receives the raw analog signal from read/write head assembly 690. Amplifier 630 provides an amplified output to a continuous time filter 635 that performs an analog low pass filter function and provides a filtered output to an analog to digital converter 640. Analog to digital converter 640 converts the analog signal to a series of digital bits that are provided to a data detector 695. Analog front end 625 may be any circuit, assembly and/or processor based function capable of receiving information from a read/write head assembly and providing a digital representation thereof. Based on the disclosure provided herein, one of ordinary skill in the art will recognize a variety of analog front ends that may be used in relation to different embodiments of the present invention. Further, read/write head assembly 690 may be any circuit, device and/or assembly capable of recording information to a storage medium and for sensing information previously written to the storage medium. Based on the disclosure provided herein, one of ordinary skill in the art will recognize a variety of read/write head assemblies that may be used in relation to different embodiments of the present invention.

A data controller circuit 645 is included that provides for directing data from write circuit 610 to either read/write head assembly 690 (i.e., standard write mode) or to read circuit 620 (i.e., loopback mode), and from read/write head assembly 690 to read circuit 620 (i.e., standard read mode). The output of continuous time filter 635 is additionally provided to a fly height calculation module 660 that is operable to determine whether a fly height 685 is too large or too small. As shown, fly height 685 is the distance from read/write head assembly 690 to the surface of a disk platter 680. The relative fly height is provided as a fly height output 665. Further, the output of continuous time filter 635 is provided to a fly height calibration module 650 that is operable to determine $\alpha_{AFE}$ for analog front end 625. Fly height calibration module 650 is enabled based on a periodic calibration enable signal 657, and the determined $\alpha_{AFE}$ value is updated to a lookup memory 655 whenever periodic calibration enable signal 6457. The $\alpha_{AFE}$ value may be retrieved from memory 655 and used by fly height calculation module 660 to calculate fly height output 665.

In operation, data controller 645 is configured in loopback mode when periodic calibration enable 657 is asserted so that data written via write circuit 610 is provided to read circuit 620. In this configuration, a series of logic 1s and logic 0s are written via write circuit 610 to read circuit 620. The series of logic 1s and logic 0s result in a sine wave at the output of continuous time filter 635. It should be noted that other repetitive waveforms may be used in place of a sine wave. The sine wave exhibits a fundamental frequency that differs depending upon which of a number of disk zones 692 that the pattern is expected to replicate. In particular, disk platter 680 is divided into a number of radial disk zones 692 that are labeled A-G. It should be noted that the number of disk zones is merely exemplary, and that any number of disk zones may be employed in accordance with different embodiments of the present invention. The fundamental frequency of a pattern written to reflect that written to a disk zone closer to the center (e.g., disk zone G) is higher than that written to reflect that written to a disk zone closer to the outer edge (e.g., disk zone A). The particular disk zone is indicated by a disk zone input 693 that indicates which of disk zones 692 is being replicated by the data written via write circuit 610. When periodic calibration enable 657 is asserted, fly height calibration module 650 performs a discrete Fourier transform on the received sine wave that yields not only the fundamental frequency of the sine wave, but also the third harmonic of the sine wave. From this, $\alpha_{AFE}$ is calculated based on the following equation:

$$\alpha_{AFE} = \frac{\text{Measured Fundamental Frequency in Loopback Mode}}{\text{Measured Third Harmonic Frequency in Loopback Mode}}.$$

This value is recalculated for different variations of temperature (as indicated by a temperature sensor 675) and supply voltage (as indicated by a supply sensor 670). The calculated value of $\alpha_{AFE}$ is written to lookup memory 655 in a location dictated by disk zone input 693, temperature (as indicated by the output of temperature sensor 675), and supply voltage (as indicated by the output of supply sensor 670). In one particular embodiment of the present invention, fly height calibration module 650 includes a discrete time Fourier transform circuit capable of providing the fundamental frequency and the third harmonic frequency. These two frequencies are provided to a processor that executes firmware/software instructions that performs the mathematical manipulation of the preceding equation. In other embodiments of the present invention, the mathematical manipulation is performed in hardware. The process is repeated for each of disk zones 692, and selected variations of temperature and supply voltage, with a different value of $\alpha_{AFE}$ being written to lookup memory 655 for each of the calculations.

During standard operation when periodic calibration enable 657 is not asserted, a corresponding series of logic 0s and logic 1s read from disk platter 680 via read/write head assembly 690, and provided to read circuit 625 by data controller 645. At the time the data is received, disk zone input 693 is asserted indicating which of disk zones 692 that the pattern was derived from. The output from continuous time filter 635 is provided to fly height calculation module 660. Fly height calculation module 660 performs a discrete Fourier transform that again yields the fundamental frequency of the sine wave and the third harmonic of the sine wave. From this and the value of $\alpha_{AFE}$ corresponding to the disk zone 492 identified by disk zone input 493, temperature and supply voltage that is accessed from lookup memory 655, a fly height factor (i.e., fly height output 665) can be calculated based on the following equation:

$$\text{Fly Height Output } 665 = \frac{\text{Measured Fundamental Frequency}}{\text{Measured Third Harmonic Frequency}} * \alpha_{AFE}.$$

When the fly height increases, the third harmonic frequency decreases relative to the fundamental frequency (i.e., fly height output 665 increases). When the fly height decreases, the third harmonic frequency increases relative to the fundamental frequency (i.e., fly height output 665 decreases). By incorporating $\alpha_{AFE}$ in the calculation of fly height output 665, the variations on analog front end due to temperature, supply voltage and process can be reduced. By using disk zones, a more accurate estimate of $\alpha_{AFE}$ can be generated specifically for a particular area from which data is generated, and varying temperature and supply voltage.

Figure 7:
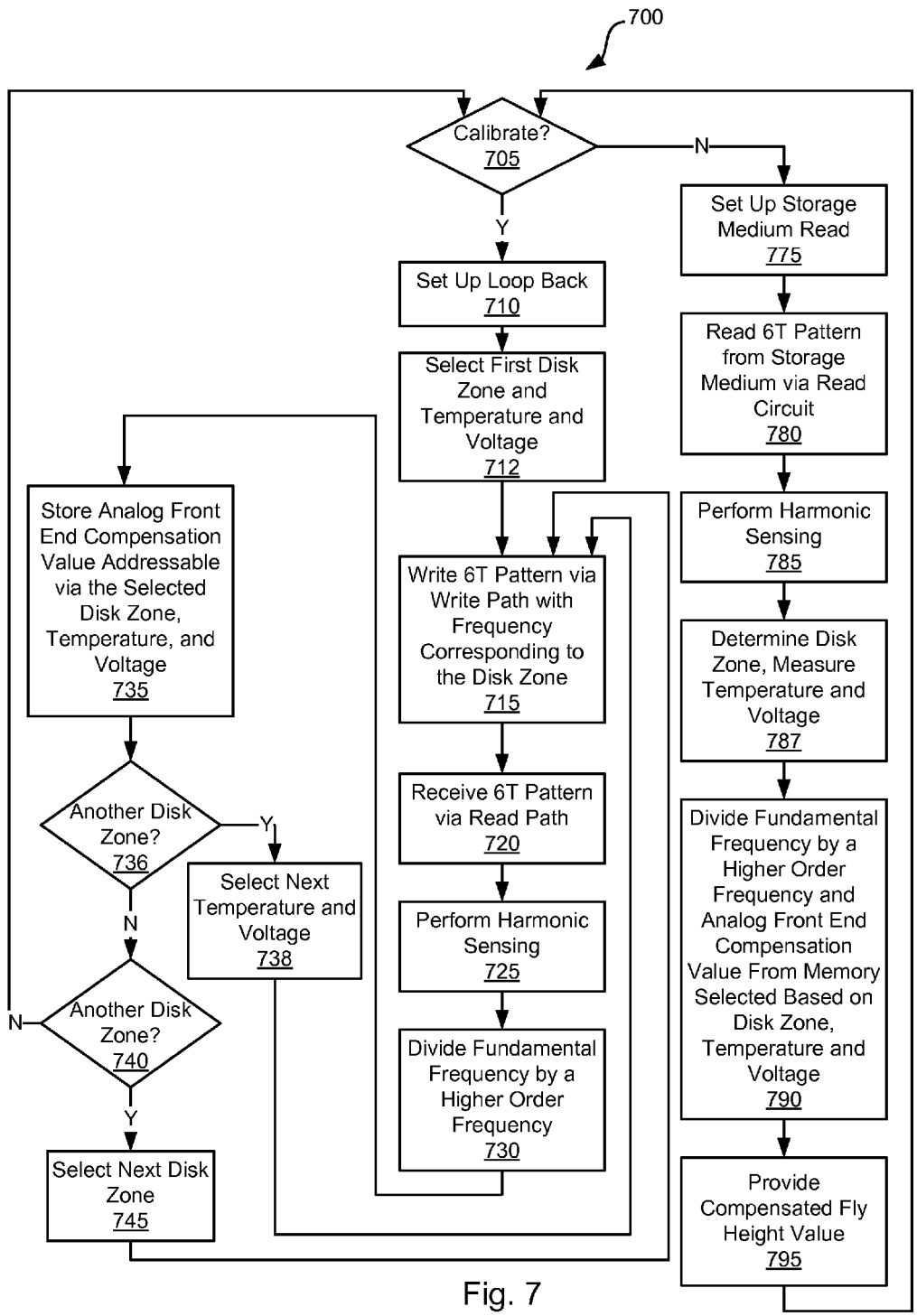
FIG. 7 is a flow diagram depicting a method in accordance with some embodiments of the present invention for determining fly height using disk zone information, temperature and voltage.

Turning to FIG. 7, a flow diagram 700 depicts a method in accordance with some embodiments of the present invention for determining fly height using disk zone specific information. Following flow diagram 700, it is determined whether a calibration process is selected (block 705). Such a calibration process may be selected by, for example, asserting periodic calibration enable 657. In some cases, calibration is done during fabrication of a storage system, during burn in of a storage medium, or a specified or selected times during the life of the storage system. Where a calibration process is selected (block 705), a data loopback is setup (block 710). Such a loopback provides for passing data written via a write circuit directly to the read circuit. In addition, a first disk zone and temperature/supply voltage combination is selected for which an $\alpha_{AFE}$ signal will be calculated (block 712). A 6T pattern (i.e., 111111000000 having a period of 12T) is written via the write circuit (block 715), and received via the read circuit (block 720). The frequency of the 6T pattern varies depending upon the selected disk zone. Such a pattern yields a sine wave. Harmonic sensing is performed on the sine wave to determine the fundamental frequency of the sine wave and the third harmonic frequency of the sine wave (block 725). In one particular embodiment of the present invention, the harmonic sensing is done using a discrete Fourier transform that yields the fundamental frequency and the third harmonic frequency. The fundamental frequency is divided by the third harmonic frequency to yield $\alpha_{AFE}$ (block 730) specific for the selected disk zone, and the $\alpha_{AFE}$ value is stored to a memory at an address that corresponds to the selected disk zone (block 735).

It is then determined whether additional temperature/supply voltage combinations remain for which $\alpha_{AFE}$ values are to be generated for the selected disk zone (block 736). Where additional temperature/supply voltage combinations remain (block 736), the next temperature/supply voltage combination is selected (block 738) and the processes of blocks 715-736 are repeated for the selected temperature/supply voltage combination. Where no additional temperature/supply voltage combinations remain (block 738), the memory has been filled with $\alpha_{AFE}$ values for each desired temperature/supply voltage combination for the particular disk zone.

It is then determined whether additional disk zones remain for which $\alpha_{AFE}$ values are to be generated and stored to memory (block 740). Where additional disk zones remain (block 740), the next disk zone is selected (block 745) and the processes of blocks 715-740 are repeated for the selected disk zones. Where no additional disk zones remain (block 740), the memory has been filled with $\alpha_{AFE}$ values for each respective disk zone, temperature and supply voltage, and the process of calibration is considered complete.

In normal operation mode (i.e., when calibration is not selected) (block 705), the system is set up to transfer information from the storage medium to the read circuit (block 775). A 6T pattern is read from the storage medium (block 780), and harmonic sensing is performed on the 6T pattern (block 785). The harmonic sensing may be the same harmonic sensing used during the calibration phase. Thus, for example, the harmonic sensing may be done by performing a discrete Fourier transform on the sine wave generated by the 6T pattern. This yields both the fundamental frequency of the sine wave and the third harmonic frequency of the sine wave. The disk zone from which the data is derived is determined and the temperature and supply voltage are measured (block 787), and that information is used to select the appropriate $\alpha_{AFE}$ value from memory. The fundamental frequency is divided by the third harmonic frequency and the $\alpha_{AFE}$ value specific to the identified disk zone, temperature and supply voltage (block 790). The resulting value is provided as a compensated fly height value (block 795).

In conclusion, the invention provides novel systems, devices, methods and arrangements for measuring fly height. While detailed descriptions of one or more embodiments of the invention have been given above, various alternatives, modifications, and equivalents will be apparent to those skilled in the art without varying from the spirit of the invention. For example, the aforementioned systems and devices may be modified for operation on higher order harmonics. Thus, for example, the approach may include measuring the fundamental frequency and either the fourth harmonic or sixth harmonic of a 12T pattern (i.e., 111111111111000000000000 having a period of 24T) written in place of the 6T pattern. In such a case, the following equation operates to define $\alpha_{AFE}$:

$$\alpha_{AFE} = \frac{\text{Measured Fundamental Frequency in Loopback Mode}}{\text{Measured Fourth or Sixth Harmonic Frequency in Loopback Mode}}.$$

Similarly, the equation for calculating the fly height output is calculated in accordance with the following equation:

$$\text{Fly Height Output} = \frac{\text{Measured Fundamental Frequency}}{\text{Measured Fourth or Sixth Harmonic Frequency}} * \alpha_{AFE}.$$

Based on the disclosure provided herein, one of ordinary skill in the art will recognize a variety of other measurements and calculations that may be done to achieve an accurate fly height in accordance with different embodiments of the present invention. Therefore, the above description should not be taken as limiting the scope of the invention, which is defined by the appended claims.

What is claimed is:

1. A system for determining fly height, the system comprising:
   a frequency determination circuit operable to:
   receive a first signal corresponding to a first data set, and to provide a first fundamental frequency and a first higher order frequency based on the first signal; and
   receive a second signal corresponding to a second data set, and to provide a second fundamental frequency and a second higher order frequency based on the second signal;
   a compensation variable calculation circuit, wherein the compensation variable calculation circuit is operable to divide the first fundamental frequency by the first higher order harmonic to yield a compensation variable; and
   a fly height calculation circuit, wherein the fly height calculation circuit is operable to divide the second fundamental frequency by the second higher order harmonic and the compensation variable to yield an indication of a fly height.

2. The system of claim 1, wherein the first data set is derived from a write channel, and the second data set is derived from a read circuit.

3. The system of claim 1, wherein the system further comprises:
   a head assembly disposed in relation to a storage medium;
   a write channel;
   a read circuit, wherein the read circuit is operable to receive information from both the head assembly and the write channel; and
   wherein the fly height is a distance between the head assembly and the storage medium.

4. The system of claim 3, wherein the first data set is derived from the write channel, and the second data set is derived from the head assembly.

5. The system of claim 1, wherein the first higher order harmonic and the second higher order harmonic are selected from a group consisting of: a third order harmonic, a fourth order harmonic, and a sixth order harmonic.

6. The system of claim 1, wherein the frequency determination circuit implements a discrete Fourier transform.

7. The system of claim 3, wherein the system further comprises a memory, and wherein the memory is operable to receive the compensation variable from the compensation variable calculation module, and wherein the memory is operable to provide the compensation variable to the fly height calculation module.

8. The system of claim 5, wherein the fly height calculation module receives an indication that the second information is derived from the second zone of the storage medium, and wherein the fly height calculation module is operable to divide the second fundamental frequency by the second higher order harmonic and the second compensation variable to yield an indication of a distance between the head assembly and the storage medium.

9. The system of claim 1, wherein the system is implemented as storage device.

10. A method for calculating relative fly height, the method comprising:
    disposing a head assembly a fly height distance from a storage medium;
    receiving a first pattern;
    based at least on the first pattern, calculating a compensation variable;
    storing the compensation variable;
    receiving a second pattern from the storage medium; and
    based at least on the second pattern and the compensation variable, calculating an indication of the fly height distance.

11. The method of claim 10, wherein the first pattern is derived from a source other than the storage medium.

12. The method of claim 1, wherein the source other than the storage medium is a write circuit.

13. The method of claim 10, wherein the first pattern and the second pattern are 6T patterns.

14. The method of claim 10, wherein calculating the compensation variable includes:
    determining a fundamental frequency of a signal corresponding to the received first pattern;
    determining a higher order harmonic of the signal corresponding to the received first pattern; and
    dividing the fundamental frequency by the higher order harmonic to create the compensation variable.

15. The method of claim 14, wherein the higher order harmonic is selected from a group consisting of: a third order harmonic, a fourth order harmonic, and a sixth order harmonic.

16. The method of claim 10, wherein calculating the indication of the fly height distance includes:
    determining a fundamental frequency of a signal corresponding to the received second pattern;
    determining a higher order harmonic of the signal corresponding to the received second pattern; and
    dividing the fundamental frequency by the higher order harmonic and the compensation variable to create the indication of the fly height distance.

17. The method of claim 16, wherein determining the fundamental frequency and determining the higher order harmonic is done by performing a discrete Fourier transform.

18. The method of claim 10,
    wherein the read circuit includes an analog front end, and wherein the compensation variable compensates for one or more variables of the analog front end selected from a group consisting of: temperature and supply voltage; and
    wherein calculating the compensation variable includes calculating a first compensation variable for a first combination including one or more of temperature and supply voltage, and calculating a second compensation variable for a second combination including one or more of temperature and supply voltage;
    selecting one of the first compensation variable and the second compensation variable; and
    wherein calculating the indication of the fly height distance includes:
    determining a fundamental frequency of a signal corresponding to the received second pattern;
    determining a higher order harmonic of the signal corresponding to the received second pattern; and
    dividing the fundamental frequency by the higher order harmonic and the selected compensation variable to create the indication of the fly height distance.

19. The method of claim 18, wherein selecting the one of the first compensation variable and the second compensation variable includes:
    measuring at least one of temperature and supply voltage; and
    selecting one of the first compensation variable and the second compensation variable based on a combination of one or more of a measured temperature and a measured supply voltage.

20. The method of claim 10, wherein the storage medium includes at least a first disk zone and a second disk zone; wherein the first pattern exhibits a fundamental frequency specific to the first disk zone; wherein the compensation variable is specific to the first disk zone; and wherein the method further comprises:
    determining that the second pattern is derived from the first disk zone;
    based at least in part on the determination that the second pattern is derived from the first disk zone, selecting the compensation variable;
    wherein calculating the indication of the fly height distance includes:
    determining a fundamental frequency of a signal corresponding to the received second pattern;
    determining a higher order harmonic of the signal corresponding to the received second pattern; and
    dividing the fundamental frequency by the higher order harmonic and the selected compensation variable to create the indication of the fly height distance.

* * * * *